Sept. 8, 1959 S. B. ROBBINS 2,903,613
APPARATUS FOR AND METHOD OF WAVE GUIDE ENERGY
TRANSMISSION MODULATION, CONTROL AND CUT-OFF
Filed May 13, 1955 2 Sheets-Sheet 2

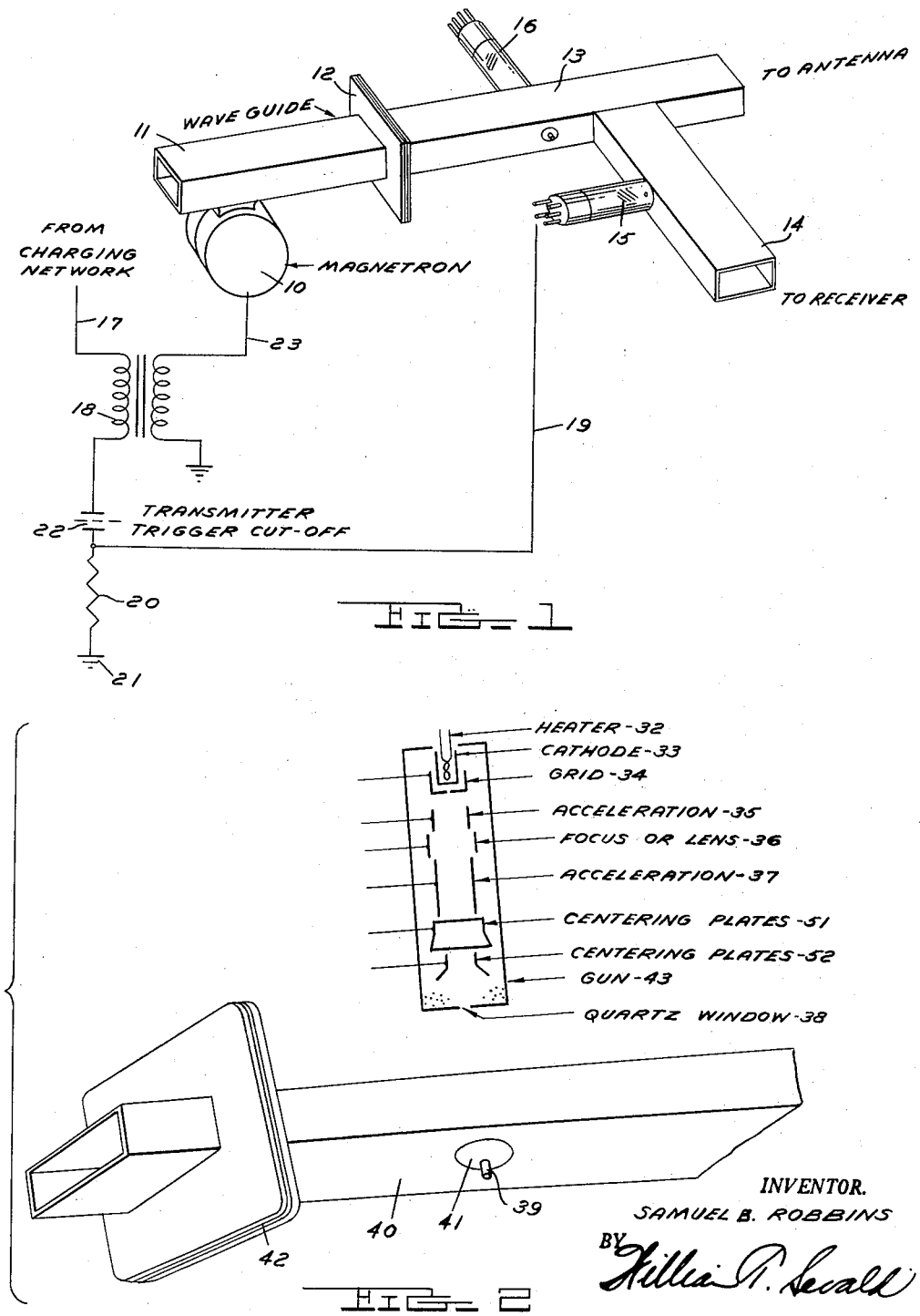

INVENTOR.
SAMUEL B. ROBBINS
BY
ATTORNEY

United States Patent Office 2,903,613
Patented Sept. 8, 1959

2,903,613

APPARATUS FOR AND METHOD OF WAVE GUIDE ENERGY TRANSMISSION MODULATION, CONTROL AND CUT-OFF

Samuel B. Robbins, Davison, Mich., assignor to Sam Robbins, Inc., Flint, Mich., a corporation of Michigan Application May 13, 1955, Serial No. 508,183

1 Claim. (Cl. 315—3)

This invention generally relates to electrical impulse modulation, acceleration, and micro-wave switching and particularly pertains to a new, novel, and inventive apparatus, combination of elements, and the method of controlling electrical micro-wave energy.

In bi-directional alternating sending and receiving continuous wave or pulse-type systems, such as is used in all types of radar sensing and radar remote control systems, which not only send outgoing electrical energy but also receive incoming electrical energy, it is the usual practice to use a common antenna which is switched back and forth between the transmitter apparatus and the receiver apparatus so that the antenna is connected to the transmitter during the sending cycles and connected to the receiver during receiving cycles. The transmitter sends a strong signal out to the object being scanned or controlled and the energy bounces back from the object as an echo and is returned to and received by the same antenna as a relatively extremely weak signal compared to the sending current which necessitates an extremely sensitive receiver apparatus having delicate defining crystals co-ordinated to the relatively weak echo so that the device is capable of as accurate reception as possible. The receiving apparatus and especially its crystals are sensitive and are subject to damage by strong electrical currents and it is therefore necessary to block out the strong transmitter currents from the receiver during the sending cycle and to channel the echo to the receiver between sending transmitter pulses.

In the present equipment, the transmitter utilizes a magnetron, klystron, or other electrical RF current generating and discharging medium and the emitted electrical energy signal is sent through a wave guide to the micro-wave antenna and the antenna then projects the signals into space. Upon the signals contacting an object, they are reflected back to the antenna and into the wave guide and are switched from the transmitting wave guide portion to the receiving wave guide portion and thence to the receiver. In other words, it is necessary to have the transmitter wave guide portion open and the receiver wave guide portion closed during transmitting cycles and the transmitter wave guide portion closed and the receiver wave guide portion open during receiving cycles and this operation is referred to as "switching."

The use of a common antenna for transmitting and receiving in pulse radar requires fast-acting switches to disconnect the receiving apparatus from the antenna during the transmitting cycle, and to disconnect the magnetron during the period when echoes are being received. These two switches are called the TR (transmit-receive) switch and the AT, R (anti-transmit, receive) switch, respectively. The duplexer is that portion of the micro-wave circuit, near the T-junction of the receiving branch and the magnetron antenna line, where the TR and AT, R switches are located.

At present, a spark gap or gas discharge tube is used to perform the necessary switching operations. The high-power current from the magnetron breaks down the gap in the AT, R tube cavity and the power flows out toward the antenna and the gap cavity in the TR tube in the receiving branch likewise breaks down, and it is designed so that a short circuit is placed across the line to the receiver. The delicate input circuits of the receiver are thereby theoretically protected. However, since the TR tube uses a spark gap, there is a short time interval between the magnetron firing and ionization time across the spark gap. The power getting past to the receiver during this time is called the pre-ignition "spike" and if this power is in excess of 0.1 watt, the crystal or crystals may be damaged, and at best the life of the crystal is shortened to a great extent. Also the gap must take a few microseconds to deionize at the end of the magnetron pulse and echoes from nearby objects are lost during deionization time. A typical specification calls for less than 3-db attenuation 6 $\mu$ sec. after the pulse, and as this energy travels approximately 328 yards per microsecond, the minimum range is established by this factor.

The electrodes of the TR and the AT, R tubes are disposed in the wave guide so that the space between them is small enough to ionize a path therebetween and these terminals and the necessary insulators encumber the interior of the wave guide and interfere with the energy traveling therethrough.

This switching is accomplished in present day equipment by placing an arc across the wave guide to block the desired wave guide portion with a short circuit during the interval desired, and for optimum results, the short circuit should be co-extensive in time with the stream of electrons being blocked or switched.

The present equipment, however, does not provide optimum results in that the short circuit in the receiver wave guide portion lags the start of the transmitted pulse thereby allowing a portion of the strong transmitter pulse or "spike" to enter the receiver so as to damage same and reduce the life of the crystals and this short circuit lags the termination of the transmitting pulse thereby cutting off or impeding the start of the receiving cycle. This results in the minimum range factor in present scanning radar in that echoes from relatively nearby objects are cut off or impeded from the receiver due to the fact that the echo from the outgoing transmitted cycle return so fast that it arrives during the time lag of the TR switch, resulting in poor definition or complete loss of sensing of objects within the minimum range.

This lag in the switching occurs due to deionization time incident to an inherent in spark gap or gas discharge tubes in that it is essential to de-ionize the gas or gap simultaneous with transmission termination. Quick ionization is achieved by keeping the potential near the ionization point but this results in easier continued ionization so that termination of ionization is found difficult and impossible within the time necessary. While this assists in initiating discharge, it hinders terminating discharge in that while the starting lag is decreased, the terminating lag is increased and the ionization time lag is "cut off one end and put on the other end."

The present invention accomplishes switching by blocking the desired wave guide portion with a stream or beam of electrons during the interval desired which stream or beam of electrons is co-extensive in time and duration with the RF energy being switched and is co-ordinated in time and duration with the transmitting and receiving cycles so that no lag occurs either in the beginning or at the end of the cycles.

The section of wave guide and its electron gun is placed between the magnetron or klystron (whichever type is being used as an RF source) and the antenna. The electron gun when operating acts as a variable attenuation on the power being transmitted through the wave guide, this attenuation variation is directly proportional to the signal placed on the grid of the electron gun. The percentage of modulation (to cut off) can be controlled by the acceleration anode potential, the latter preferably but not necessarily being a fixed adjustment in initial set up of the equipment, and should be adjusted to cut off with maximum desired signal on the grid of the electron gun. Thus any intelligence can be superimposed on the amplitude of the RF carrier easily and accurately. Some of the present uses of this type of modulator are as a device to amplitude modulate a micro-wave carrier; to pulse a micro-wave carrier as in missile guidance; and as a TR tube in pulse radar.

By using an electron gun, we correct for two limitations of present radar. By utilizing the transmitter trigger, the receiver is protected before the magnetron energy reaches the crystals, there is no longer a "spike" and cut off of the gun emission can be adjusted to termination of the magnetron pulse. The receiver input is increased due to the lowering of the attenuation in the TR device.

In micro-wave telephony, the RF electrical energy is used unidirectionally so that the time delay of ionization and deionization is not a limiting factor as no signal returns, but the present equipment is limited to a single signal or one continuous intelligence medium on the micro-wave similar to the original wire telephony but obviously much faster and without the limitations of wire. This limits the present micro-wave telephony systems to the volume capacity of the transmitter and receiver. The instant development is capable of superimposing additional signals or intelligence on the same micro-waves so as to render the present installations capable of sending several signals or media of intelligence at the same time on the same beam thereby multiplying the volume capacity of the transmitters and receivers without duplicating installations by merely substituting the instant electron control or influence for the one presently in use. This would give amplitude modulation on the present FM carrier.

It is, therefore, an object of the invention to provide a method, combination of elements, and apparatus capable of controlling AM modulation and accurately controlling the duty cycle of pulse radar switching without involving lags and delay in ionization and deionization time and without the use of any moving mechanical contrivance.

An object of the invention is to provide an electron gun mounted on a wave guide which is capable of immediately starting and stopping a secondary flow of controlling, switching, or influencing signals relative to the primary flow of signals traveling in the wave guide.

An object of the invention is to provide a device capable of controlling the energy traveling in a wave guide which does not require terminals and insulators disposed within the wave guide so that the wave guide is not encumbered and the energy traveling therethrough has an uninterrupted path.

An object of the invention is to provide means capable of accurate variable attenuation on the energy being transmitted through a wave guide.

An object of the invention is to provide means for directing the controlling beam of electrons through the wave guide aperture so that thermal influences causing deformation can be corrected.

An object of the invention is to trigger, fire, or energize the control grid of the electron gun to synchronized electron emission of the gun co-extensively in time with the wave guide electron flow to be controlled, switched, modulated or influenced.

An object of the invention is to provide synchronized triggering, firing, and termination of the primary and secondary electron emissions so that the secondary flow or impulse of electrons is co-existent in time relative to the primary flow of impulse of electrons so that the secondary flow or impulse will not impede any returning signal echoes generated by the primary flow or impulse such as in a radar system.

An object of the invention is to correct for the present two limitations of radar by protecting the receiver before the magnetron energy reaches the crystals as the "spike" is eliminated, and, by lowering the attenuation in the TR device the receiver input is increased as the gun emission cut off can be adjusted to the termination of the transmitting pulse.

An object of the invention is to provide a device, system and combination to amplitude modulate a micro-wave carrier as in micro-wave telephony and missile guidance and other remote control applications.

An object of the invention is to provide a new TR tube switch for pulse radar.

These and other objects of the invention will be apparent by reference to the following description of the electronic control and influence system and combination embodying the invention taken in connection with the accompanying drawings in which:

Fig. 1 is a perspective schematic showing of an application of the invention to radar showing one wiring plan for synchronous triggering with the gun projecting across the long dimension of the wave guide.

Fig. 2 is an exploded perspective enlarged view of a portion of the device of Fig. 1 showing the electron gun and wave guide in more detail and showing the gun projecting across the short dimension of the wave guide and equipped with beam centering deflection plates.

Figure 3:
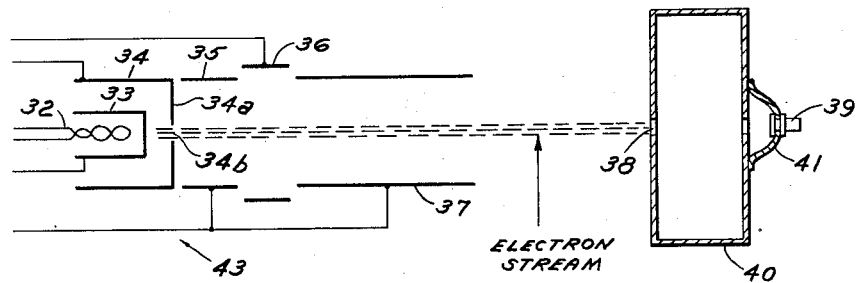
Fig. 3 is a detailed diagrammatic showing of the gun and wave guide integration in the mode of Fig. 2.

Referring now to the drawings wherein like numerals refer to like and corresponding parts throughout the several views, the system and combination disclosed therein to illustrate the invention comprises a magnetron 10 of the pulse type connected to the wave guide section 11 so as to feed the RF energy through the powdered metal unidirectional coupler 12 past the duplexer section 13 to the antenna, not shown. The duplexer section 13 has a receiver wave guide section 14 joining the transmitter wave guide section 11 at right angles with a TR electron gun 15 disposed so as to beam electrons across the section 14 and an AT, R, and an electron gun 16 disposed so as to beam electrons across the wave guide section 11 just ahead of the junction with the wave guide section 14 leading to the receiver. The guns 15 and 16 may be similar to the gun now used in all common cathode ray tubes.

The magnetron 10 and the TR gun are adapted to be triggered to fire simultaneously and co-extensively in time in that the lead 17 from the charging network connects to one side of the transformer 18 in series with lead 19 to the control grid of the electron gun 15 and through resistance 20 to ground 21 via the transmitter trigger condenser 22 which is adapted to fire the magnetron 10 via the lead 23 so that when the magnetron 10 fires energy signals down the wave guide 11, the TR electron gun 15 also fires a beam of electrons across the wave guide portion 14 blocking the path of signal flow in the receiver wave guide portion 14 preventing transmitter RF energy from going into the receiver thereby protecting the receiver from RF energy and since this beam terminates with the magnetron pulse, the wave guide portion 14 is open to receive between magnetron pulses permitting full signal to the receiver. The gun apertures are placed transverse to the axis of the wave guide and due to the gun operating only in a vacuum, this aperture in the gun is sealed with a thin piece of quartz and it has been found helpful to place a small amount of phosphorus or fluorescent material around the aperture to aid in the focusing of the electron beam visually.

When this electron beam or stream is across the wave guide, it has the effect of the grid in the present vacuum tube adjusted by the magnitude of the electrons leaving the cathode in the gun. The speed of the electrons is controlled by the acceleration anode of the gun and the amplitude of the electron stream can either be controlled by the grid or cathode placing the grid positive in respect to the cathode for emission and reversing the potential for cut off. This in effect will amplitude modulate or valve the output from the RF source.

Referring to Figs. 2 and 3, the gun 43 terminals are mounted on the base and are respectively attached to the thermionic emission heater element 32 which is flanked by the cathode 33 and these elements generate a cloud of electrons between them which elements and cloud are flanked by the control grid 34 which is equipped with a disc 34A having an aperture 34B axially aligned with the preaccelerating electrode 35 and when the grid 34 is energized as by the lead 19, it sends the electrons through the aperture 34B past the pre-accelerating electrode 35 which in turn projects the electrons past the lens or focusing electrode 36 which collimates the stream or beam of electrons which are then projected by the accelerating electrode 37 through the thin quartz window 38 in the tube case 38A across the short dimension of the wave guide 40 toward the terminal 39 on the opposite side of the wave guide 40 which terminal 39 is isolated from the wave guide 40 by the insulator 41. The choke coupling joint 42 is interposed on the emitting or magnetron end of the wave guide to suppress standing waves. It is obvious to one skilled in the art of radar missile guidance, remote control, and microwave telephony that the terminal 39 as well as the other terminals and connections are made in the manner well known to achieve the results stated by properly powering, circuiting, and connecting the devices, systems, and combinations. The terminal 39 may be eliminated in some instances and is included for complete showing. More particularly, the beam is controlled in intensity by the control grid 34 pierced diaphragm immediately in front of the flat oxide coated cathode 33. Immediately in front of the grid 34 is the first acceleration grid or anode 35 and this has a positive potential of a few hundred volts and serves to attract the electrons from the space charge in much the same way as the screen in an ordinary tetrode or pentrode.

The next grid or anode 36 is the focus. This anode 36 is so shaped that strong electron lens actions are produced by the fields between the two gaps. Adjustment of the focus is made by controlling the potential of the focus grid. From here the electron stream passes through the second acceleration grid or anode 37 which preferably is maintained at the same potential as the first acceleration grid and imparts an acceleration to the electron stream. The electron beam is focused to a very small (approximately .003 inch) beam width at the wave guide converging on the pierced hole.

The electrons are given their final high velocity by a potential difference of a few thousand volts maintained by the cathode and an anode 39.

The electrostatic deflection of the beam for centering it on the wave guide aperture is accomplished by passing the beam between two orthogonal pairs of deflecting electrodes or plates. The deflection due to each pair of plates 51 and 52 is accurately proportional to the potential difference between its members and means are provided, not shown, for varying this potential to maintain the beam aligned with the wave guide aperture to compensate for thermal deformations tending to misalign the beam.

The individual deflections due to the two pairs of plates add vectorially. The deflection sensitivity at the wave guide depends upon the geometry of the deflection plates themselves, their distance from the wave guide, and the velocity of the electrons as they pass the plates. The two pairs are similar in geometry, but since they are at different distances from the wave guide, their deflection sensitivities are unequal, therefore, the plates nearest the wave guide must be compensated for.

Any variation of the means potential between either pair of plates has a marked effect on the focus. As several type electron guns are in use in the industry, it would be possible to use some other type and achieve the same end result. However, for this discussion, we will refer only to the type using post-electrostatic deflection acceleration.

It may be pointed out with good logic that every transmission line which carries alternating current power is really a wave guide. Energy may well be considered as moving along a co-axial line or parallel wire line in the form of a wave. Whether the waves are thought of as electromagnetic field quantities or simple sinusoidal distributions of current and voltage, the picture is the same. A transmission line is essentially like a track which guides the energy along a certain direction. Common usage, however dictates that the term wave guide be restricted to indicate what might be more accurately called hollow-pipe wave guide or at least a wave guide in which there are not two distinct conductors.

It is always true that a particular pattern of electromagnetic field is formed as a wave, and that the pattern moves along the wave guide with the energy flow, the speed of energy in a wave guide is only $\frac{1}{10}$ to $\frac{1}{20}$ of the speed of light or energy in free space, but any one of many sorts of patterns may occur in a given piece of apparatus. It is said that a wave guide may operate in any one of many modes. A particular mode can be chosen by the use of proper wave guide dimensions and by a proper choice of the mechanism used to launch the waves into the wave guide.

The physical dimension of the pierced wave guide will not be given as this is dependent on the fundamental frequency of the RF source and the output frequency desired. The final answer always depends upon the distribution in time and space of the electric and magnetic fields.

The complete story of wave guide propagation and the design of terminations, joints, bends, etc. is a difficult one; so difficult in fact that some current practices are still best classed as an art rather than as a science. When direct and complete calculations can be made, they must be often based on Maxwell's field equations and they give results directly in terms of the E and H field. The whole idea of reactance and impedance is then only an unnecessary step in obtaining the solution. More often, however, the mathematical calculations must be tempered by the empirical data; impedance quantities serve to present facts analogous to the problems which arise in transmission line theory.

As one or the other of the electric or magnetic fields will be found to have no component along the length of a wave guide and when the electric field is such that it is the one which lies entirely in planes lying across or transverse of the wave guide, the mode is a "transverse electric" mode and is referred to as TE and the magnetic lines then extend in part along the length of the wave guide. Should this be the desired mode, in the instant development, the position of the electron gun on the wave guide would be as shown in Figs. 2 and 3 with the gun mounted on the side of the guide and beam across the short cross-sectional dimension and transverse to the long cross-sectional dimension. On the other hand, when the magnetic is the one wanted and which has only the cross-wise components, the mode is designated as "transverse magnetic" mode or TM and the electron gun is then mounted on the wave guide as seen in Figs. 1 and 4 and on the edge of the wave guide and the beam projected along the long cross-sectional dimension and transverse to the short cross-sectional dimension.

Figure 4:
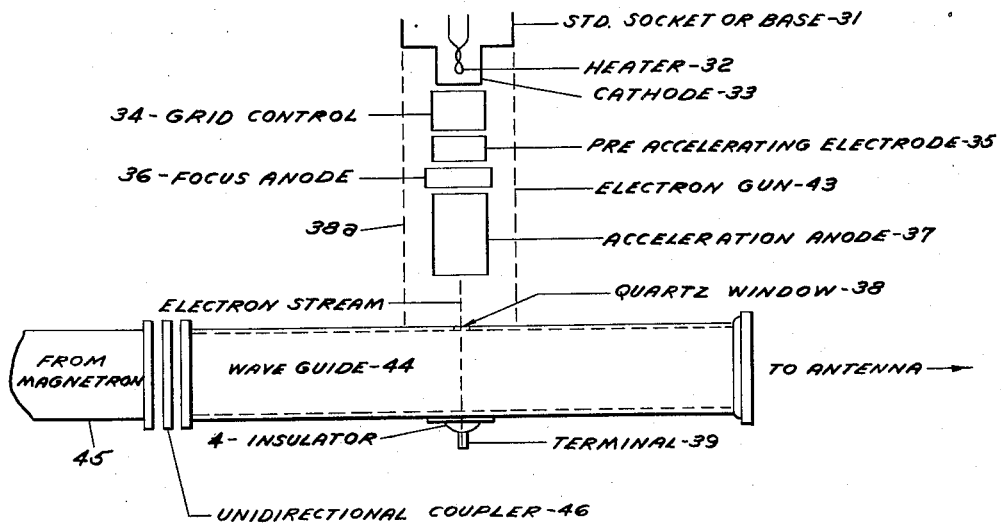
Fig. 4 is a schematic showing of a modulator system employing the invention in the mode of Fig. 1.

Referring to the device of Fig. 4, the electron gun 43 seen in Figs. 2 and 3 is beamed across the wave guide 44 long dimension (which is the same as Fig. 1 and 90° angularly varied from Figs. 2 and 3) and the wave guide 44 is connected to the wave guide 45 leading from the magnetron, klystron, or other RF source by the uni-directional powdered metal uni-directional coupler to suppress all voltage standing waves and that could be reflected back into the source and other end of the wave guide 44 is coupled through a choke joint to the antenna, not shown. The electron gun 43 when synchronously operating acts as a variable attenuation on the power being transmitted through the wave guide and this attenuation variation is directly proportional to the signal or energy placed on the grid 34 of the electron gun 43, as this controls electron emission from the gun. The percentage of modulation (to cut off) can be controlled by the acceleration anode potential with the latter preferably being a fixed adjustment in the initial equipment set up and should be adjusted to cut off with the maximum desired signal on the grid 34 of the electron gun 43. Thus any intelligence can be superimposed on the amplitude of the RF carrier easily and accurately and used to amplitude modulate a micro-wave carrier, to pulse a micro-wave carrier, or as a switch such as a TR tube.

Although but a few embodiments of the invention have been shown and described in detail, it is obvious that many changes may be made in the size, shape, detail, wiring, circuits, construction, and arrangement of the various elements of the invention within the scope of the appended claim.

I claim:

The combination of a wave guide having an aperture, an electron gun beamed through said aperture transversely across said wave guide interior for controlling the energy traveling in the wave guide and a quartz plate disposed over said aperture sealing said gun in an evacuated condition and permitting transfer of electrons from said gun to said wave guide.

References Cited in the file of this patent
UNITED STATES PATENTS

| | | |
|---|---|---|
| 1,735,302 | Slack | Nov. 12, 1929 |
| 1,937,849 | Slack | Dec. 5, 1933 |
| 2,009,457 | Sloan | July 30, 1935 |
| 2,370,700 | Wolff | Mar. 6, 1945 |
| 2,413,963 | Fiske | Jan. 7, 1947 |
| 2,422,190 | Fiske | June 17, 1947 |
| 2,456,466 | Sunstein | Dec. 14, 1948 |
| 2,493,706 | Washburne | Jan. 3, 1950 |
| 2,681,987 | Farr | June 22, 1954 |
| 2,683,251 | Ramo | July 6, 1954 |